United States Patent
Boyapalle et al.

(10) Patent No.: US 12,135,809 B2
(45) Date of Patent: Nov. 5, 2024

(54) SYSTEMS AND METHODS FOR TRANSFERRING INFORMATION HANDLING SYSTEMS

(71) Applicant: DELL PRODUCTS L.P., Round Rock, TX (US)

(72) Inventors: Anantha K. Boyapalle, Cedar Park, TX (US); Charles D. Robison, Buford, GA (US); Vaibhav Soni, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 356 days.

(21) Appl. No.: 17/542,360

(22) Filed: Dec. 3, 2021

(65) Prior Publication Data

US 2023/0177190 A1    Jun. 8, 2023

(51) Int. Cl.
  *G06F 21/62*    (2013.01)
  *H04L 9/40*    (2022.01)
(52) U.S. Cl.
  CPC ...... *G06F 21/6218* (2013.01); *H04L 63/0823* (2013.01)
(58) Field of Classification Search
  CPC ......... G06F 21/6218; G06F 2221/2143; H04L 63/0823
  See application file for complete search history.

(56) References Cited

U.S. PATENT DOCUMENTS 9,130,910 B1 *  9/2015  Logue ............... H04L 63/0823
9,147,075 B1 *  9/2015  Litvin .................. H04L 63/06
(Continued)

FOREIGN PATENT DOCUMENTS

CN    1822020 B  *  5/2010  .......... H04L 9/3236
CN   102202047 A  *  9/2011  .......... H04L 1/0041
(Continued)

OTHER PUBLICATIONS

Yo, Hiyo. English translation of JP 2009053772 A. (Year: 2009).*
(Continued)

*Primary Examiner* — Sarah Su
(74) *Attorney, Agent, or Firm* — Egan, Enders & Huston LLP

(57) ABSTRACT

Systems and methods are provided that may be implemented in one example to physically transfer or relocate information handling systems between facilities of different system owners in a manner that is downstream of the original equipment manufacturer (OEM) of the transferred information handling system/s, and which in one example may be managed in part or in whole by the OEM's customer base. In conjunction with facilitating physical transfer of each given information handling system directly between different enterprise owners, the disclosed systems and methods may also be implemented at the same time to utilize a unique identifier (that is assigned by the OEM manufacturer to each given information handling system) to manage transfer of the registration or other type of association of the given information handling system assets between the enterprise OEM user accounts of the different enterprise owners that are maintained by an OEM of the information handling system assets.

21 Claims, 4 Drawing Sheets

(56) References Cited

U.S. PATENT DOCUMENTS

| | | | |
|---|---|---|---|
| 9,672,362 B2* | 6/2017 | Butcher | G06F 21/575 |
| 11,574,080 B1* | 2/2023 | Khatri | G06F 21/602 |
| 2016/0162693 A1* | 6/2016 | Breuer | G06F 3/0637 |
| | | | 713/164 |
| 2019/0334951 A1* | 10/2019 | Konetski | G06F 21/57 |
| 2021/0133336 A1* | 5/2021 | Andrews | G06F 21/602 |
| 2021/0136082 A1* | 5/2021 | Andrews | H04L 63/105 |
| 2021/0258665 A1* | 8/2021 | Sadasivarao | H04L 63/0853 |
| 2022/0207145 A1* | 6/2022 | Young | G06F 21/575 |
| 2023/0072152 A1* | 3/2023 | Hamlin | G06F 21/608 |
| 2023/0102228 A1* | 3/2023 | Okuno | G06F 21/78 |
| | | | 726/27 |
| 2023/0125588 A1* | 4/2023 | Savage | H04L 9/3263 |
| | | | 713/175 |
| 2023/0127882 A1* | 4/2023 | Young | H04L 9/3234 |
| | | | 713/156 |
| 2023/0130256 A1* | 4/2023 | Savage | H04L 9/0894 |
| | | | 713/156 |
| 2023/0208828 A1* | 6/2023 | Kolodziej | H04L 63/0823 |
| | | | 726/6 |
| 2024/0022555 A1* | 1/2024 | Koikara | H04L 63/0272 |

FOREIGN PATENT DOCUMENTS

| | | | | |
|---|---|---|---|---|
| CN | 106096456 B | * | 4/2019 | G06F 16/90 |
| CN | 112150113 A | * | 12/2020 | |
| CN | 112309520 A | * | 2/2021 | |
| CN | 113515762 A | * | 10/2021 | |
| CN | 116566613 A | * | 8/2023 | G06F 21/57 |
| JP | 2009053772 A | | 3/2009 | |
| WO | WO-2017161464 A1 | * | 9/2017 | G06F 21/6254 |
| WO | WO-2018223235 A1 | * | 12/2018 | G06F 21/577 |
| WO | WO-2019177563 A1 | * | 9/2019 | G06F 21/30 |

OTHER PUBLICATIONS

Boyapalle et al., "Systems and Methods for Associating Attested Information Handling Systems to End User Accounts", U.S. Appl. No. 17/354,654, filed Jun. 22, 2021, 30 pgs.

Phelps et al., Dell Technologies; "Dell Technologies Supply Chain Security: Secured Component Verification For PowerEdge", 2020, 3 pgs.

Dell Technologies, "Securing Business in a World of Transformation", Oct. 2021, 11 pgs.

Wikipedia, "Trusted Computing Base", Obtained from Internet Nov. 19, 2021, 5 pg.

Low et al., "Systems and Methods to Orchestrate Trusted Enrollment", U.S. Appl. No. 17/458,088, filed Aug. 26, 2021, 34 pgs.

Lockhart, "What Is PC as a Service (PCaaS)?—Definition From WhatIs.com", Captured from Internet Nov. 29, 2021, 4 pgs.

"UEFI Shell Specification", Revision 2.2, Jan. 26, 2016, 258 pgs.

\* cited by examiner

SYSTEMS AND METHODS FOR TRANSFERRING INFORMATION HANDLING SYSTEMS

FIELD

This application relates to information handling systems and, more particularly, to transferring information handling systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Product registration of a given information handling system (such as a notebook computer, desktop computer or server) allows a system purchaser to take ownership of the given information handling system, to ensure that the warranty for the given information handling system is connected to the system purchaser, and to ensure entitlements for licenses, services and contracts persist for the system purchaser. However, original equipment manufacturers (OEMs) use many different channels to sell information handling systems to customers that include enterprise organizations such as corporations, non-profit organizations (NPOs) and government agencies. For example, a given information handling system may be transferred to a final enterprise owner through one or more different intermediary enterprise owners such as channel partners or other third parties. In such a case, the new enterprise owner who purchased the given information handling system will not own the licenses tied to software entitlements and provisioning.

Managing the transfer of information handling system assets and warranties from an original enterprise owner to a new and different enterprise owner is a tedious and manual process that currently requires the new enterprise owner to make a Warranty and Ownership transfer request by filling out and submitting an online form across the Internet to the system OEM. To make the warranty and ownership transfer request, the new enterprise owner typically must provide system and owner identification information to the system OEM, including the system service tag or serial number, the name of the previous enterprise owner, the name of the new enterprise owner, etc. For large scale multiple-system transfers, this is often a complicated and time-consuming procedure. Moreover, it may take the OEM a significant amount of time (e.g., close to 30 days) to process and then email an approval or denial of a given warranty and ownership transfer request to the new enterprise owner. Transfer of information handling system ownership between different enterprises is additionally inefficient since the transferred information handling system must be double-shipped to verify system integrity & sanitization.

One example of a conventional lifecyle management and secure transfer method that has been employed by an OEM to verify that a new system user has validly taken possession of a given information handling system requires that the previous registered system user of the given information handling system log onto the system manufacturer's website to first remove the trusted binding from their account to the given information handling system and confirm transfer of the given information handling system to the new system user. . . . In this method, the system manufacturer "bricks" the given information handling system if the original secure binding is not first removed by the previous registered user so as to deter theft.

Digital Device Identity Secured Component Verification is a technique that creates an integrity protected manifest of a given information handling system and its components.

SUMMARY OF THE INVENTION

Systems and methods are disclosed herein that may be implemented in one embodiment to streamline the physical transfer or relocation of information handling systems between different system owners in a manner that is downstream of the original equipment manufacturer (OEM) of the transferred information handling system/s, and which in one embodiment may be managed in part or in whole by the OEM's customer base. Examples of such information handling system owners include, but are not limited to, different enterprises (e.g., organizations such as corporations, non-profit organizations (NPOs), government agencies, etc.), and in one embodiment enterprise owners may include ultimate end-purchaser organizations, as well as wholesalers, retailers, other resellers, etc. In conjunction with facilitating physical transfer of each given information handling system directly between different enterprise owners, the disclosed systems and methods may also be implemented at the same time to utilize a unique identifier (that is assigned by the OEM manufacturer to each given information handling system) to manage transfer of the registration or other type of association of the given information handling system assets between the enterprise OEM user accounts of the different enterprise owners that are maintained by an OEM of the information handling system assets.

In one embodiment, the disclosed systems and methods may be implemented to provide an endpoint and enterprise owner implementation to allow more streamlined end-to-end lifecycle management service (e.g., such as PC as a Service "PCaaS") for an information handling system, which cuts out many required aspects of a conventional lifecycle management methodology for information handling systems, e.g., including conventional steps of the reissuance process and its associated ownership and entitlements (including, for example, licenses, services, and/or licenses tied to software entitlements and provisioning). In one embodiment lifecycle management for information handling systems may be implemented to transfer information handling system assets when an information handling system reaches its end of subscription (e.g., such as 3 years), e.g., utilizing a backend orchestration system to manage the transfer using a unique identifier (UID) for the information handling system and a firmware (e.g., PCaaS application and/or unified extensible firmware interface "UEFI" BIOS) agent in a basic input/output system "BIOS" environment to manage the lifecycle of the information handling system.

In one embodiment, the disclosed systems and methods may be implemented to provide a seamless method to directly reallocate and transfer one or more (e.g., all) information handling systems from the OEM user account of one enterprise to the OEM user account of another enterprise in a way that best suits their capabilities (e.g., such as asset recovery, asset support, driver/software (SW) application ecosystem, damage, warranty, tracing/location, etc. In one embodiment, an information handling system OEM may also monetize such method to a management model that allows the information handling systems to be retained and re-used in order to improve sustainability. In one embodiment, the disclosed systems and methods may be implemented to utilize the reputations of different pre-existing enterprise (e.g., corporate) OEM user accounts to allow immediate and trusted transfer of the ownership of an information handling system from a first enterprise to a second and different enterprise, and then allowing the first enterprise to contest and remediate the ownership transfer within a predefined window of time.

In one embodiment, the disclosed systems and methods may condition information handling system transfer on ownership attestation to an OEM provider of a lifecycle management service, and to provide a secured sanitization (e.g., "power wash") of the transferred information handling system/s to ensure that personal identifiable information (PII) of the previous enterprise owner is protected during the transfer by removal of the previous owner PII from the transferred system/s. In one embodiment, the disclosed systems and methods may be implemented to build and update a telemetry base on an OEM server database to track the lifecycle of an information handling system, e.g., including during transfer/s between different enterprise owners. In one embodiment, the disclosed systems and methods may be implement to provide soft and non-intrusive transfer of OEM information handling systems without OEM involvement in the manual shipping process of the transferred information handling systems between different enterprises.

In one respect, disclosed herein is a method, including first verifying current hardware components installed as part of a local information handling system by determining if the current hardware components are the same as original hardware components that were installed as part of the local information handling system during manufacture of the local information handling system; and then performing the following only if it is determined that the current hardware components are the same as the original hardware components: sanitizing the local information handling system by erasing all personal identifiable information from non-volatile memory and storage of the local information handling system; then physically transferring the sanitized local information handling system from a first enterprise facility of a first enterprise to a second and different second and different enterprise facility of a second enterprise; then verifying a current unique identifier (UID) of the local information handling system by determining if a current UID that is currently stored on the local information handling system is the same as an original UID that was originally assigned to the local information handling system at manufacture time of the local information handling system; and then changing an association of the local information handling system with the first enterprise to an association with the second enterprise only if it is determined that the current UID is the same as the original UID.

In another respect, disclosed herein is a system, including a local information handling system that includes at least one programmable integrated circuit that is programmed to first verify current hardware components installed as part of the local information handling system at a first enterprise facility of a first enterprise by determining if the current hardware components are the same as original hardware components that were installed as part of the local information handling system during manufacture of the local information handling system, and then perform the following only if it is determined that the current hardware components are the same as the original hardware components: sanitizing the local information handling system by erasing all personal identifiable information from non-volatile memory and storage of the local information handling system prior to a physical transfer of the sanitized local information handling system from the first enterprise facility of the first enterprise to a second and different enterprise facility of a second and different enterprise; then, after the sanitized local information handling system is physically transferred from the first enterprise facility to the second enterprise facility, verifying a current unique identifier (UID) of the local information handling system by determining if a current UID that is currently stored on the local information handling system is the same as an original UID that was originally assigned to the local information handling system at manufacture time of the local information handling system; and then sending a notification across at least one network from the second enterprise facility to at least one remote information handling system only if it is determined that the current UID is the same as the original UID of the local information handling system, the notification indicating that the local information handling system is currently associated with the second enterprise.

In another respect, disclosed herein is A system including: a remote information handling system coupled by at least one network to a local information handling system, a first administrative information handling system of a first enterprise, and a second administrative information handling system of a second enterprise, the remote information handling system including at least one programmable integrated circuit programmed to administer an association information of the first enterprise and an association information of the second enterprise, the association information of the first enterprise and the second enterprise including respective separate pre-existing accounts of the first enterprise and the second enterprise that are maintained and administered by the at least one remote information handling system; and at least one database communicatively coupled to the remote information handling system. The at least one programmable integrated circuit of the remote information handling system is programmed to: track an elapsed time of a pre-defined fixed period of time during which the local information handling system is physically located at a first enterprise facility of the first enterprise, then send across the at least one network a notification to the first administrative information handling system when it is determined that a remaining time of the predefined fixed period of time is equal to a designated minimum threshold amount of remaining time, then receive across the at least one network a request from the second administrative information handling system to change an association of the local information handling system with the first enterprise to an association with the second enterprise, then, in response to the received request from the second administrative information handling system, deploy across the at least one network a software or firmware agent to execute on the local information handling system, then receive across the at least one network from the software or firmware agent executing on the local information handling system a second certificate associating the local information handling system with a second enterprise from a local information handling system, then replace a first certificate associating the local information handling system with the first enterprise with the second certificate in the at least one database to associate the local information handling system with the second enterprise, then send a notification across the at least one network to the first administrative information handling system notifying the first administrative information handling system of the completion of the change of the association of the local information handling system with the first enterprise to the association with the second enterprise by sending a notification across the at least one network to the administrative server, and then revoke the second enterprise account of the second enterprise that is administered by the remote information handling system only if a communication that disputes the validity of the change of the association of the local information handling system to the second enterprise is received across the at least one network from the first administrative server within a designated time limit after sending the notification across the at least one network to the first administrative server.

DESCRIPTION OF ILLUSTRATIVE EMBODIMENTS

Figure 1:
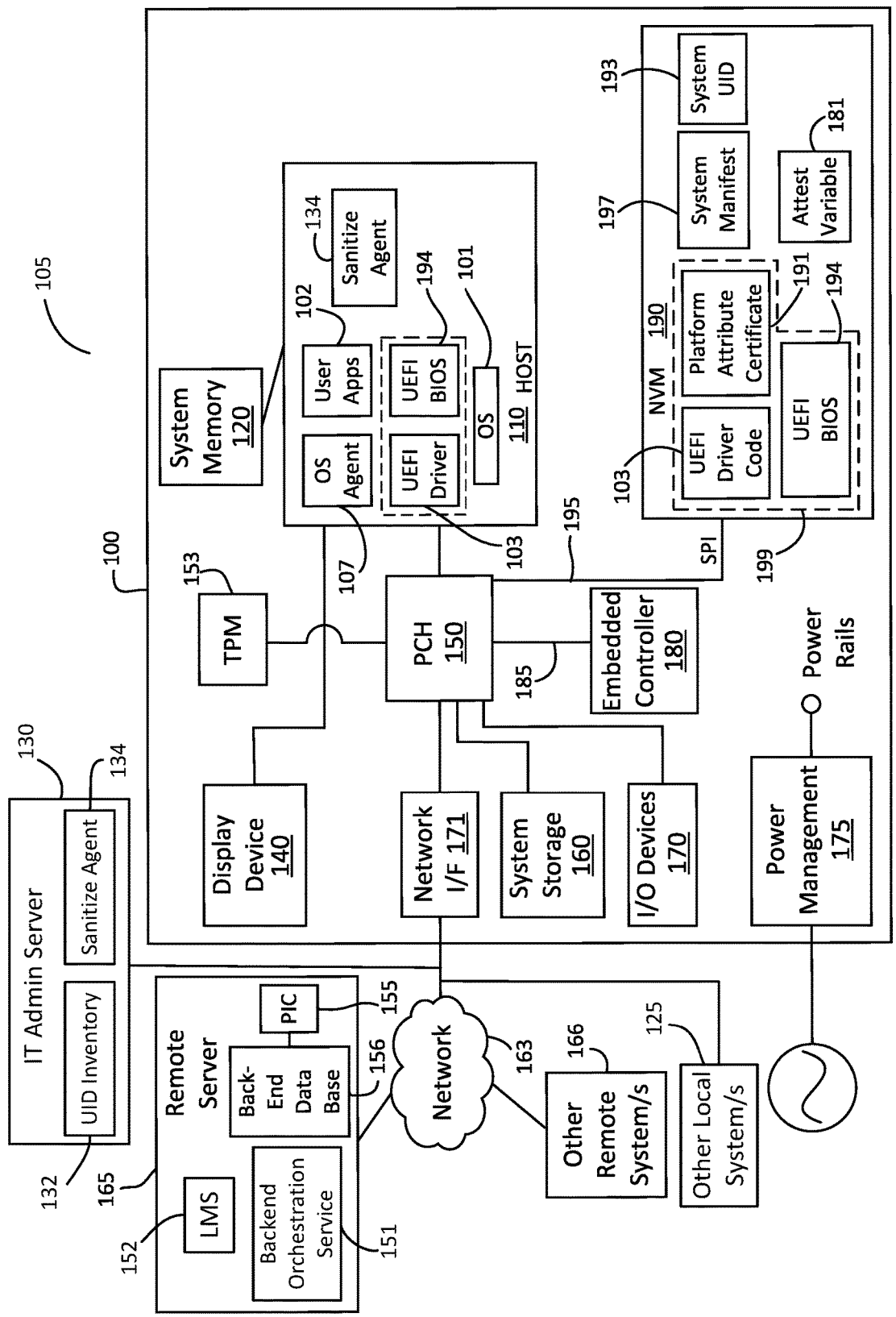
FIG. 1 illustrates a block diagram of an information handling system according to one exemplary embodiment of the disclosed systems and methods.

FIG. 1 is a block diagram of an information handling system 100 (e.g., a desktop computer, computer server, laptop computer, tablet computer, MP3 player, personal data assistant (PDA), cell phone, etc.) as it may be configured and communicatively coupled within a computing environment 105 of an enterprise owner according to one embodiment of the disclosed systems and methods. In one embodiment, information handling system 100 may include a system chassis enclosure (e.g., metal and/or plastic chassis such as notebook computer case, 1U or 2U metal server case, metal or plastic desktop or tower computer case, etc.) that encloses and surrounds system various hardware components, e.g., as illustrated in FIG. 1 by the box labelled 100 that surrounds various system hardware components in in FIG. 1. It will be understood that the configuration of FIG. 1 is exemplary only, and that the disclosed methods may be implemented on other types of information handling systems. It should be further understood that while certain components of an information handling system are shown in FIG. 1 for illustrating embodiments of the disclosed systems and methods, the information handling system is not restricted to including only those components shown in FIG. 1 and described below.

As shown in FIG. 1, information handling system 100 may be a local (e.g., endpoint) client system that may generally include a host programmable integrated circuit 110 programmed to execute an operating system (OS) 101 (e.g., such as Microsoft Windows 10, Linux OS, etc.) and BIOS 194 for system 100 (e.g., with a protected and signed persistent UEFI driver 103 that is available in the UEFI partition on non-volatile memory), along with other code such as user software applications 102 (e.g., word processing application, Internet browser, computer game, PDF viewer, spreadsheet application, etc.), a downloaded OS (e.g., software) agent 107, etc. In FIG. 1, host programmable integrated circuit 110 may be configured to access non-volatile memory (NVM) 190 (e.g., serial peripheral interface (SPI) Flash memory) to load and boot part of a system UEFI BIOS 194 (together with UEFI driver 103) from NVM 190. Other non-volatile memory (NVM) devices may be additionally or alternatively present such as for system storage 160, e.g., including solid state drive/s (SSDs), hard drive/s, etc. Host programmable integrated circuit 110 may include any type of processing device, such as an Intel central processing unit (CPU), an Advanced Micro Devices (AMD) CPU or another programmable integrated circuit. Host programmable integrated circuit 110 is coupled to system memory 120, which may include, for example, random access memory (RAM), dynamic RAM (DRAM), synchronous DRAM (SDRAM).

In the illustrated embodiment, host programmable integrated circuit 110 of system 100 may be coupled to an external or internal (integrated) display device 140 (e.g., LCD or LED display or other suitable display device) depending on the particular configuration of information handling system 100. In such an embodiment, integrated graphics capability may be implemented by host programmable integrated circuit 110 to provide visual images (e.g., a graphical user interface, static images and/or video content) to a system user. . . . However, in other embodiments, a separate programmable integrated circuit (e.g., such as graphics processor unit "GPU") may be coupled between host programmable integrated circuit 110 and display device 140 to provide graphics capability for information handling system 100.

In the embodiment of FIG. 1, PCH 150 of system 100 controls certain data paths and manages information flow between components of the information handling system 100. As such, PCH 150 may include one or more integrated controllers or interfaces for controlling the data paths connecting PCH 150 with host programmable integrated circuit 110, system storage 160, input/output (I/O) devices 170 forming at least a part of a user interface for the information handling system, network interface (I/F) device (e.g., network interface controller "NIC") 171, embedded controller (EC) 180, and NVM 190 where UEFI BIOS firmware image 194 may be stored together with persistent UEFI driver code 103, as well as other code and/or data such as platform attribute certificate 191, manufacturer unique identifier (UID) 193 (e.g., such as EC UID), and system component manifest 197. UID 193 may be, for example, a manufacturer-assigned alpha-numeric system service tag or serial number stored on current system 100 and that is unique to the particular machine upon which OS agent 107 is currently executing. This UID 193 may be assigned by the manufacturer at time of the system manufacture, and stored at manufacture on NVM 190 (or other non-volatile memory device of system 100).

In one embodiment, firmware code for UEFI driver 103 and a Platform Attribute Certificate 191 (e.g., such as a Dell Secure Component Verification "SCV" certificate available from Dell Technologies Inc. of Round Rock, Texas) may be provisioned (e.g., populated and stored) along with code for UEFI BIOS code 194 in a UEFI partition 199 on NVM 190 or other non-volatile memory (e.g., storage system 160) of information handling system 100 at the time of system manufacturing (e.g., during factory install "FI") and originally shipped with system 100 from the manufacturer. In one embodiment, Platform Attribute Certificate 191 may be signed by a hardware security module (HSM) and may be bound to the system TPM 153.

In one embodiment, Platform Attribute Certificate 191 may list the as-built hardware configuration (e.g., including a list such as a lookup table of originally installed hardware components) of information handling system 100, and this manufactured hardware configuration is cryptographically locked to a platform attribute certificate 191 that is a hardware certificate bound to a given information handling system 100 by a trusted platform module (TPM) 153 of system 100 that is signed by a hardware security module (HSM). In one embodiment, the system UID (e.g., such as alpha-numeric system service tag or system serial number) may be present as a certificate identifier included within Platform Attribute Certificate 191 and/or a software identifier (SW ID) may be present as a device identifier for software and included within Platform Attribute Certificate 191. Platform attribute certificate 191 may also include other system information identifying hardware components of information handling system 100, such as chassis information (e.g., identity of platform manufacturer, model type and chassis type), serial number of system memory 120, local area network-on-motherboard (Network LOM) serial number, serial number/s of system storage device/s 160, serial number of system motherboard, identity of the type of system CPU 110 and its manufacturer, etc.

System manifest 197 may be created later by UEFI driver 103 (e.g., that is executing on host programmable integrated circuit 110 during a first time boot sequence for system 100 after delivery of system 100 to an end user). Examples of original manufacturer-installed system hardware that may be listed in Platform Attribute Certificate 191 include, but are not limited to, system storage 160 (e.g., such as individual solid state drive/s, hard drive/s, etc.), optional integrated display device 140 if present (e.g., LCD display, OLED display, etc.), network interface (I/F) device (e.g., network interface controller "NIC") 171, optional GPU/s (if any), host CPU 110 (e.g., chipset), devices of system memory 120 (e.g., RAM, DRAM, SDRAM, etc.), embedded controller 180, etc.

In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit (I2C) interface, a Universal Serial Bus (USB) interface and a Thunderbolt™ interface.

Also shown present in FIG. 1 is local system storage 160 (e.g., one or more media drives, such as hard disk drives, optical drives, NVRAM, Flash memory, solid state drives (SSDs), or any other suitable form of non-volatile memory) that is coupled through PCH 150 to provide non-volatile storage for information handling system 100.

A power source for the information handling system 100 may be provided via an external power source (e.g., mains power) and an internal power supply regulator, and/or by an internal power source, such as a battery. As shown in FIG. 1, power management system 175 may be included within information handling system 100 for moderating the available power from the power source. In one embodiment, power management system 175 may be coupled to provide operating voltages on one or more power rails to one or more components of the information handling system 100, as well as to perform other power-related administrative tasks of the information handling system.

In the embodiment of FIG. 1, an embedded controller (EC) 180 of system 100 is coupled to PCH 150 and may be configured to perform functions such as power/thermal system management, etc. EC 180 may also be configured to execute program instructions to boot information handling system 100, load application firmware from NVM 190 into internal memory, launch the application firmware, etc. In one example, EC 180 may include a processing device for executing program instructions to perform the above stated functions. Although not strictly limited to such, processing device of EC 180 may be implemented as a programmable integrated circuit (e.g., a controller, microcontroller, microprocessor, ASIC, etc., or as a programmable logic device "PLD" such as FPGA, complex programmable logic device "CPLD", etc.). In computer server embodiments, a baseboard management controller (BMC) may be present in the place of EC 180 to perform one or more similar functions as described above for EC 180, as well as to perform other functions specific to computer servers.

As shown in FIG. 1, EC 180 is coupled to PCH 150 via data bus 185, and NVM 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. In the embodiment shown in FIG. 1, NVM 190 may be a SPI Flash memory device that is a shared Flash memory device, which is connected to PCH 150 and EC 180. In such a configuration, PCH 150 provides EC 180 shared access to NVM 190 via eSPI bus 185, SPI bus 195 and various interface and logic blocks included within the PCH.

As further shown in FIG. 1, external and/or internal (integrated) I/O devices 170 (e.g., a keyboard, mouse, touchpad, touchscreen, etc.) may be coupled to PCH 150 of system 100 to enable the system end user to input data and interact with information handling system 100, and to interact with application programs or other software/firmware executing thereon. The network I/F device 171 may in one embodiment be a network interface controller (NIC) which may communicate with external network 163, e.g., optionally across an intervening local area network (LAN), wireless LAN (WLAN), cellular network, corporate intranet, etc. As shown, the network I/F device 171 may be present to enable wired and/or wireless communication across an external network 163 (e.g., such as the Internet and optionally one or more intervening networks) with a remote OEM server information handling system 165 (e.g., as may be operated and maintained by the original equipment manufacturer "OEM" or other manufacture of information handling system 100), and optionally with other remote information handling systems that may include, for example, another remote server 166 that hosts an OEM portal (e.g., OEM.com) through which each enterprise owner may be allowed to login to their respective OEM user account that is maintained and administered by the OEM of the system 100 using remote OEM server information handling system 165 and/or 166. Although described herein in relation to an OEM of an information handling system 100, it will be understood that the disclosed systems and methods may be similarly implemented with other types of manufacturers of an information handling systems 100, e.g., that maintain and operate corresponding manufacturer server information handling systems 165 and/or 166, and that maintain accounts and lifecycle subscriptions associated with different enterprise owners of information handling systems 100.

As further shown, network I/F device 171 may also provide communication (e.g., across an internal network such as a corporate intranet) with an information technology (IT) administrative server 130 (e.g., as may be maintained by a current enterprise owner of information handling system 100 and operated by a human IT administrator or IT decision maker "ITDM" of the current enterprise owner) that monitors and administers information handling system 100, and with other local information handling systems 125 that may also be monitored and administered by IT administrative server 130.

As shown in FIG. 1, lifecycle management service (LMS) 152 and backend orchestration service 151 may be executed on a programmable integrated circuit (PIC) 155 (e.g., CPU) of OEM remote server 165, and a backend database 156 may also be maintained in non-volatile storage of OEM remote server 165 or may be otherwise communicatively coupled or accessible by OEM remote server 165, e.g., such as maintained on a separate device or information handling system that is separate from remote server 165. These components of OEM remote server 165 may be used for remote analysis and processing in a manner described further herein, and such remote analysis and processing may be performed using code executed by programmable integrated circuit 155 (e.g., CPU) of OEM remote server 165. Also shown in FIG. 1 are UID inventory database 132 that may be stored together with sanitize tool 134 on storage of IT administrative server 130, each of which may be utilized in a manner described further herein. It will be understood that OEM remote server 165, IT administrative server 130, and each of remote information handling systems 166 may be configured in one embodiment with similar components and system architecture as information handling system 100. Moreover, it is possible that the tasks of remote server 165 may be performed (e.g., partitioned) between multiple remote servers 165 that are all communicatively coupled to network 163.

Figure 2:
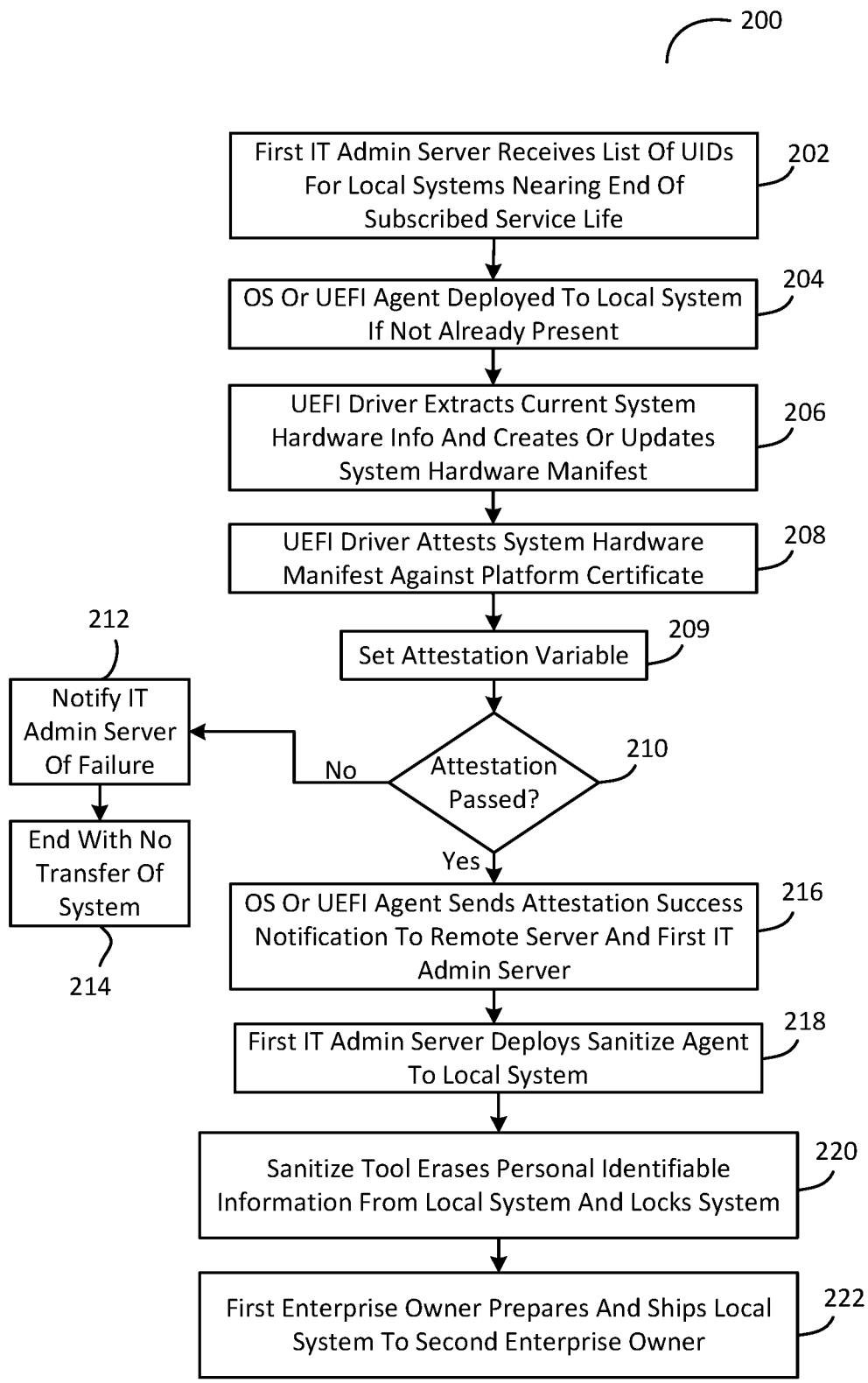
FIG. 2 illustrates methodology according to one exemplary embodiment of the disclosed systems and methods.
Figure 3:
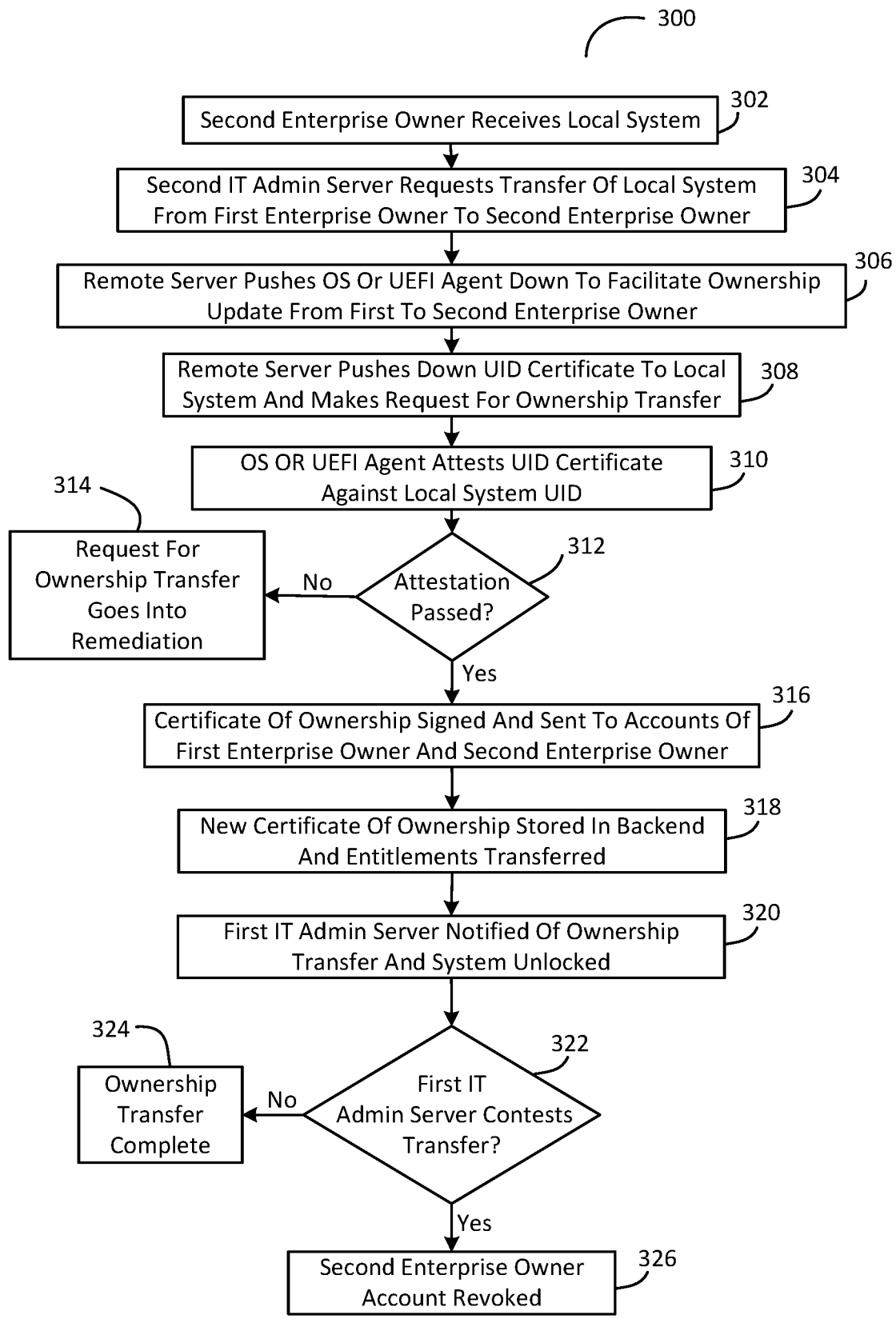
FIG. 3 illustrates methodology according to one exemplary embodiment of the disclosed systems and methods.

FIGS. 2 and 3 illustrate exemplary embodiments of a methodologies 200 and 300 that may be performed to transfer association (e.g., registration, assignment, ownership, lease, etc.) of a local (e.g., endpoint) information handling system 100 of FIG. 1 when it reaches its end of a given OEM-administered lifecycle management subscription (e.g., such as Dell PC as a Service aka "PCaaS" available from Dell Technologies Inc. of Round Rock, Texas). FIGS. 2 and 3 are described herein in relation to the exemplary embodiment of FIG. 4, which illustrates a visual representation 400 of methodologies 200 and 300 relative to a first enterprise facility 450 (e.g., an office building, factory, etc.) operated at a first physical location by a first enterprise 402 (e.g., such as a corporation, non-profit organization (NPO), government agency, etc.) and a second and different enterprise facility 460 (e.g., an office building, factory, etc.) operated at a second and different physical location (e.g., a second and different geographic location such as a different address of the same city, a different city, a different state, a different country, etc.) by a second and different enterprise 404 (a different corporation, non-profit organization (NPO), government agency, etc.). Although described using ownership transfer as an example, it will be understood that the embodiments of FIGS. 2-4 may be alternatively applied to any other type of change of system association from a first enterprise to a second enterprise including, for example, change in registration, assignment, lease, etc.

Figure 4:
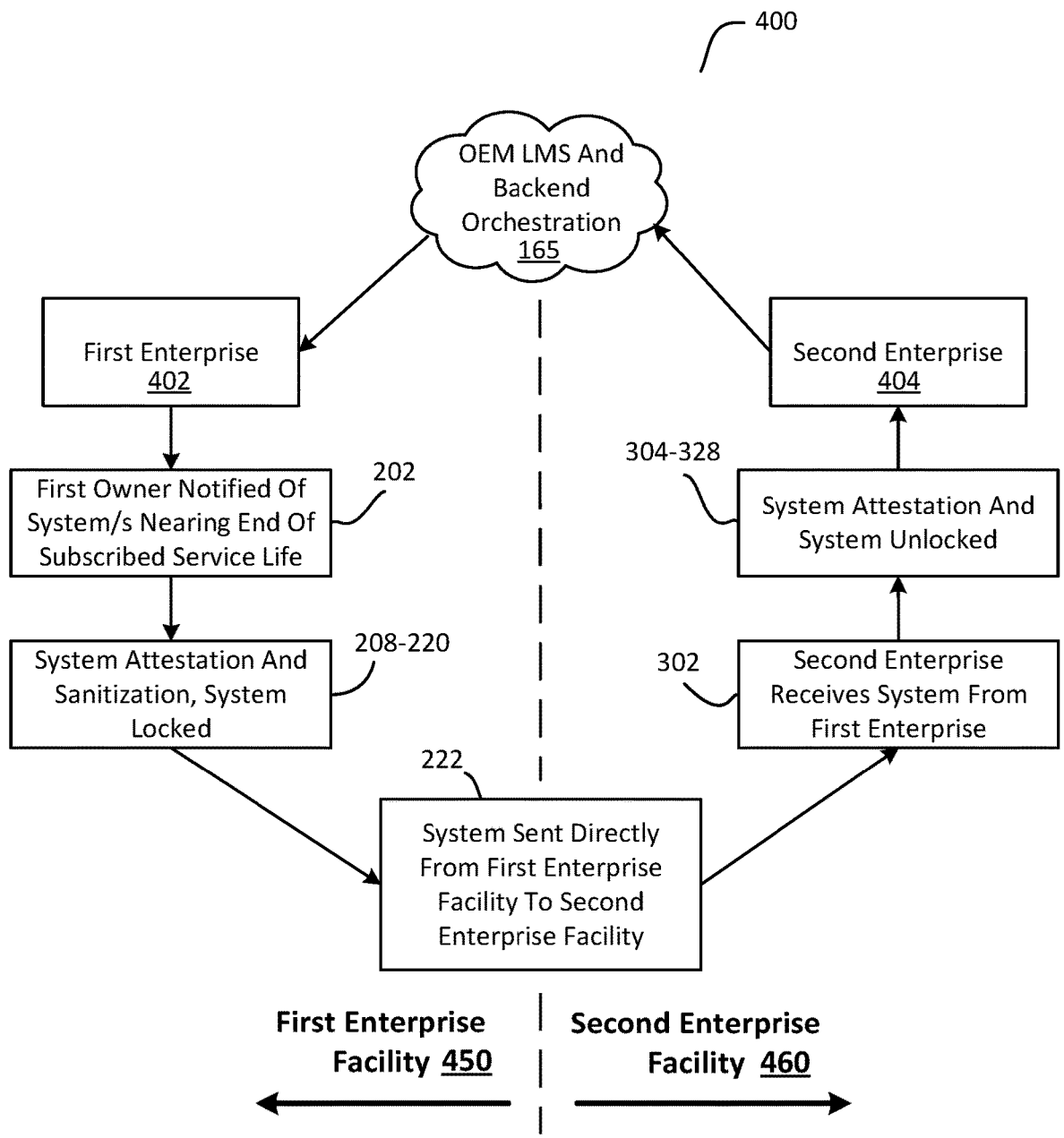
FIG. 4 illustrates a visual representation of the methodologies of FIGS. 2 and 3 according to one exemplary embodiment of the disclosed systems and methods.

In the embodiments of FIGS. 2-4, each of first and second enterprises 402 and 404 may be provided with a respective association information in the form a respective OEM user account that is administered on OEM remote server 165, e.g., possibly in cooperation with an OEM web portal (e.g., OEM.com) hosted by one of remote server systems 165 and/or 166 that provides a URL for login across network 163. In one embodiment, the OEM user account for each of first and second enterprises 402 and 404 may be a trusted (e.g., "Premium") corporate OEM account that relies on the reputation of each respective enterprise OEM user account owner to provide the required trust to allow for a physical transfer of information handling systems 100 directly between different enterprise owners, e.g., without requiring the system OEM to take physical possession of the transferred systems 100 during the transfer process. It will be understood that user accounts are just one example of association information that may be maintained by a remote server 165 to associate local information handling systems 100 with first and second enterprises 402 and 404, with other possible types of association information for association a local information handling system 100 with different enterprises including, but not limited to, registration files or lists, assignment files or lists, etc.

In the embodiments of FIGS. 2-4, a lifecycle management subscription (LMS) may be provided by an information handling system OEM to lease hardware of information hardware system 100 (and to also provide its management) to an enterprise owner for a defined amount of time (or term). To implement methodology 200, lifecycle management service 152 may execute on OEM remote server 165 to track the amount of remaining time left in a given lifecycle management subscription to a first enterprise owner for a given local information handling system 100 (e.g., such as a lifecycle management subscription for system 100 that has a total duration of three years or any other designated greater or lesser time).

Additionally, backend orchestration service 151 may be executed on OEM remote server 165 to track elapsed time of a given lifecycle management subscription or other predefined fixed period of time (e.g., such as one-year time period, two-year time period, three year time period, etc.) associated with the first enterprise owner, and to manage the transfer of ownership of the given local information handling system from the first enterprise owner to a second and different enterprise owner once it is determined by backend orchestration service 151 that the remaining time left in the given lifecycle management subscription or other predefined fixed period of time reaches a designated (e.g., pre-defined) minimum threshold amount of remaining time (e.g., such as 30 days or other designated greater or lesser minimum amount of remaining time). To enable this transfer of ownership, backend orchestration service 151 may utilize, for example, system UID information stored on the given local information handling system and also on backend database 156 (e.g., as a UID 193 that is tied to OEM user account information for a current enterprise owner of the given system 100), and UEFI driver 103 that is executing in the BIOS environment on the given local information handling system 100. It will be understood that methodology 200 may be similarly employed for any other local information handling systems 125 that are nearing the end of a given OEM-administered lifecycle management subscription, and may be simultaneously performed on multiple local information handling systems 100 and 125 that are subject to (or covered by) the same lifecycle management subscription.

Methodology 200 of FIG. 2 is performed while local information handling systems 100 and 125 are currently owned (e.g., leased) by a first enterprise 402, and while they are operated and located at a first enterprise facility 450 of the first enterprise 402 and are communicatively coupled to a first IT administrative server 130 in a first computing environment 105 that is operated by the OEM and the first enterprise owner 402. As shown in FIG. 2, methodology 200 begins in block 202 where lifecycle management service 152 tracks elapsed time and determines that the amount of remaining time left in a predefined fixed period of time such as a given lifecycle management subscription (e.g., such as one-year time period, two-year time period, three year time period, etc.) associated with the OEM user account of the first enterprise owner 402 has reached a pre-defined designated minimum threshold amount of remaining time (e.g., such as 30 days or other designated greater or lesser amount of time). When LMS 152 makes this determination, backend orchestration service 151 provides a notification containing a list of one or more respective UIDs of given local information handling systems 100 covered by the given lifecycle management subscription in block 202 to a first IT administrative server 130 maintained and operated by the first enterprise owner 402 to manage its local endpoint client systems 100 and 125. While methodology 200 is described here with reference to at least one such given local information handling system 100, it will be understood that this notification may include a list of the UIDs 193 of multiple local information handling systems 100 and 125 that are covered under the given lifecycle management subscription that is soon to expire.

Next, in block 204, the first IT administrative server 130 responds to the receipt of the list in block 202 by deploying software or firmware agent, such as a lightweight OS agent 107 (or in one alternative embodiment a UEFI BIOS agent to perform the same tasks in a BIOS environment that are described herein for OS agent 107) to the local information handling system 100 identified in the list received in block 202 (if it is has not been previously installed). As described further below, OS agent 107 executes (e.g., in an OS environment) on host programmable integrated circuit 110 of the given local information handling system 100 to collect and report results of an attestation of system UID 193 and associated data (e.g., system manifest 197) that are currently stored on the given local system 100, e.g., this stored information may be previously or concurrently generated by a UEFI driver 103 executing in the BIOS environment on the given local system 100. UEFI driver 103 may match or attest this collected information against platform attribute certificate 191 to confirm that the hardware of given local information handling system 100 has not been tampered with since original OEM manufacture and generation of platform attribute certificate 191. In this regard, platform attribute certificate 191 contains the same information that is stored in UID inventory 132 on IT administrative server 130 for the given local information handling system 100, and will not differ from the collected UID 193 and system manifest 197 unless the given system 100 has been tampered with. Further information on collection of UID and system manifest information, as well as attestation of such information is described in U.S. patent application Ser. No. 17/354,654 filed Jun. 22, 2021, which is incorporated herein by reference in its entirety for all purposes.

In one embodiment, a UEFI driver 103 that operates in the BIOS environment may already be installed on the given local system 100, and in block 206 may execute on its host programmable integrated circuit 110 to extract or otherwise gather system hardware component information on system 100 that includes type and identity of each of the connected hardware components that are currently installed as part of information handling system 100, e.g., that are currently interconnected with other information handling system components and/or contained within a chassis enclosure of system 100. Examples of such currently-installed hardware components include, but are not limited to, system storage 160 (e.g., such as individual solid state drive/s, hard drive/s, etc.), optional integrated display device 140 if present (e.g., LCD display, OLED display, etc.), network interface (I/F) device (e.g., network interface controller "NIC") 171, optional GPU/s (if any), host CPU 110, individual devices of system memory 120 (e.g., RAM, DRAM, SDRAM, etc.), embedded controller (EC) 180, etc. In one embodiment, UEFI driver 103 may be programmed to create an inventory or system manifest 197 of the extracted currently-installed hardware components of system 100, e.g., using UEFI commands to retrieve system hardware information. Examples of such commands are described in UEFI Shell Specification (Revision 2.2, Jan. 26, 2016) by Unified EFI, Inc., which is incorporated herein by reference in its entirety for all purposes.

In one embodiment, the resulting created system manifest 197 may be a look-up table that includes an entry corresponding to each currently-installed hardware component (e.g., device) of system 100 that is identified by the system inventory. Each hardware device entry of system manifest 197 may in turn include device-specific information for a corresponding hardware device that is currently installed as part of system 100, e.g., such as device serial number, memory or storage size, etc. UEFI driver 103 executing in the BIOS environment may sign the created system manifest 197 (e.g., using its private key) for security and integrity protection purposes, and may then store the created (and optionally signed) system manifest 197 on NVM 190 and/or other suitable non-volatile memory such as system storage 160.

In block 208, UEFI driver 103 may execute in the BIOS environment to run an attestation of the components of manifest 197 against a previously-stored Trusted Computing Group (TCG) Platform Attribute Certificate 191 in block 212 by comparing the identified and extracted currently-installed hardware components of system manifest 197 to the list of original manufacturer-installed hardware components contained in Platform Attribute Certificate 191 that was stored on NVM 190 or other non-volatile memory (e.g., system storage 160) of information handling system 100 at the time of system manufacturing by the OEM. In the event that the hardware attestation of block 208 does not pass verification (i.e., system manifest 197 includes additional, fewer or different hardware components than does the Platform Attribute Certificate 191) then in block 209 UEFI driver 103 may set (store) an attestation variable 181 with a value that indicates that the hardware component attestation did not pass verification (e.g., as a FAIL flag in NVM 190 or system storage 160).

However, if in block 208 UEFI driver 103 verifies that the list of currently-installed hardware components of system manifest 197 matches (is the same as) the list of original manufacturer-installed hardware components contained in Platform Attribute Certificate 191, then attestation passes verification in block 208 and in block 209 UEFI driver 103 may set (store) an attestation variable 181 having a value that indicates that the hardware component attestation has passed verification (e.g., as a PASS flag in NVM 190 or system storage 160).

Next, in block 210, OS agent 107 determines the results of the previous attestation of system manifest 197 against platform attribute certificate 191 that was performed in block 209, e.g., by reading the value of attestation variable 181 from NVM 190. If the read attestation variable 181 is determined in block 210 to have a value that indicates that the hardware component attestation did not pass verification (e.g., FAIL flag), then in block 212 OS agent 107 notifies first IT administrative server 130 of the attestation failure by sending or transmitting an attestation failure notification to first IT administrative server 130, and methodology 200 terminates in block 214 without proceeding with ownership transfer of the given local information handling system 100 to the second enterprise 404. At this time, OS agent 107 may also notify OEM remote server 165 of the attestation failure by also sending or transmitting the attestation failure notification across network 163 to OEM remote server 165, in which case backend orchestration service 151 on OEM remote server 165 may contact first administrative server 130 regarding any steps or actions that may need to be taken to address the attestation failure prior to termination of the lifecycle management subscription for the given local information handling system 100. This may include scheduling a call between the IT administrator of the first enterprise owner 402 and OEM technical service personnel to verify and account for the absence of any manufacturer-installed hardware parts from given system 100 (i.e., and therefore missing from the current system manifest 197), and/or in one embodiment the addition of any different and/or unauthorized hardware components to the given system 100 after system manufacture 197 (i.e., and therefore included in the current system manifest 197).

However, if the read attestation variable 181 is determined in block 210 to have a value that indicates that the hardware component attestation passed verification (e.g., PASS flag), then in block 216 OS agent 107 notifies first IT administrative server 130 and OEM remote server 165 of the attestation success by sending an attestation success notification to first IT administrative server 130 and OEM remote server 165. This successful attestation verifies to backend orchestration service 151 that the first enterprise 402 is the bonafide current owner of the given local information handling system 100, and is recorded (e.g., stored) in the backend database 165 to associate current ownership of the given local information handling system 100 with the given first enterprise 402.

After receiving the attestation success notification from OS agent 107 of the given information handling system 100, then in bock 218 first IT administrative server 130 deploys sanitize agent 134 to the given local information handling system 100 when the first enterprise owner 402 is ready to transfer ownership of the given information handling system 100 to another enterprise owner. Next, in block 220, the sanitize agent 134 is executed by host programmable integrated circuit 110 to erase all personal identifiable information from non-volatile memory and storage of the local information handling system 100 (e.g., including removing BIOS credentials from UEFI BIOS 194, removing user data and biometrics from storage system 160 and NVM 190, etc.) to ensure that all personal identifiable information of the first enterprise owner 402 has been removed from the given local information handling system 100 prior to transferring its ownership (and possession) from the first enterprise owner 404 at the first enterprise facility 450 to the second enterprise owner 404 at the second enterprise facility 460. Also at this time in block 220, sanitize agent 134 may be executed by host programmable integrated circuit 110 to destroy or remove OS agent 107 from system 100. After sanitization is completed, the given local information handling system 100 may be locked by re-scaling or otherwise resetting the OS 101 back to its original initial non-activated state (e.g., "factory state") which requires the next user/owner of information handling system 100 to enroll their enterprise OEM user account with or to the OS 101 in order to enable activation of OS 101 and normal function of the information handling system 100.

In block 222, the first enterprise owner 402 may prepare the given local information handling system 100 for shipping to a second enterprise 404. In one embodiment, this second enterprise 404 may be identified by the OEM seller of information handling system 100 or an OEM-authorized distributor of information handling system 100, and shipping labels for the second enterprise 404 may be sent (e.g., via email) to the first enterprise owner 402 by the OEM seller or by the OEM-authorized distributor. A responsible party of the first enterprise owner 402 (e.g., IT administrator or ITDM) may supervise preparation of the given local information handling system 100 for shipping to a second and different enterprise owner (e.g., disconnecting the system 100 from network 163 and the network of the first enterprise owner 402, packaging the given local information handling system 100 for shipment and printing and affixing shipping labels to the packaged given system 100, etc.). Then, also in block 222, the first enterprise owner 402 may physically transfer (e.g., ship by air, truck, common carrier, etc.) the given system 100 directly to a facility of a second enterpriser owner (that is located at a physical location that is different than a facility of the first enterprise owner 402 from which the given system 100 is shipped), i.e., rather than shipping the given system 100 back to the OEM of the given system 100.

Methodology 300 of FIG. 3 is performed while local information handling systems 100 and 125 are operated and located at a facility of the second enterprise 404 (i.e., that is different from the facility of the first enterprise owner 402 of methodology 200). As shown in FIG. 3, methodology 300 begins in block 302 where the second enterprise 404 receives at its facility the given information handling system 100 that was shipped to the second enterprise 404 by the first enterprise owner 402 in block 220 of FIG. 2. At this time, a responsible party of the second enterprise 404 (e.g., IT administrator or ITDM) may supervise un-packaging the given information handling system 100, and connecting the given local information handling system 100 to network 163 through the local network of the second enterprise 404 to communicatively couple the given information handling system 100 to a second IT administrative server 130 in a second computing environment 105 that is operated by the OEM and second enterprise 404.

Next, in block 304, the second IT administrative server 130 sends a request across network 163 to backend orchestration service 151 on OEM remote server 165 to transfer ownership of the given local information handling system (together with its entitlements such as, for example, licenses, services, and/or licenses tied to software entitlements and provisioning) from the first enterprise owner 402 to the second enterprise 404. For example, a human IT administrator may login (e.g., with login credentials including account ID and password) to the OEM user account of the second enterprise 404 via an OEM portal webpage (e.g., OEM.com) that may be hosted by one of remote systems 165 and/or 166, and which communicates with backend orchestration service 151 on OEM remote server 165 to fulfill the requested ownership transfer. For example, a human IT administrator may operate the second IT administrative server 130 to access a web browser (e.g., having a designated and pre-defined URL) which allows the IT administrator to access OEM remote server 165/166 across network 163 and login with password or other suitable user authentication technique to their pre-existing system-manufacturer (OEM) user account (e.g., such as an OEM user account previously created by the IT administrator when system 100 was previously ordered from the manufacturer).

In block 306, backend orchestration service 151 on OEM remote server 165 responds to the request of block 304 (e.g., communicated via the OEM portal) by contacting the given information handling system 100 and pushing down or otherwise deploying OS agent 107 to system 100 for sanitizing and facilitating the ownership update request. In block 308, the backend orchestration service 151 on OEM remote server 165 pushes down a UID certificate across network 163 to the given local information system 100 to be used for device attestation (e.g., that includes only the system UID from backend database 156 that corresponds to the system UID originally assigned at system 100 manufacture by the OEM to the given local information system 100 for which ownership transfer is requested). Next, in block 310, OS agent 107 executes on host programmable integrated circuit 110 to retrieve the system UID 193 from NVM 190 on the given system 100, and attests the system 100 by comparing the downloaded UID certificate against the retrieved system UID 193 to confirm they are the same.

If attestation of system 100 fails in block 312 (e.g., downloaded UID certificate does not match system UID 193), then OS agent 107 notifies backend orchestration service 151 of this attestation failure and methodology 300 proceeds to block 314, where the request for ownership transfer goes into remediation, e.g., backend orchestration service 151 contacts IT administrative server 130 to schedule a technical service call between OEM technical personnel and an IT administrator of the second enterprise 404 to resolve the problem.

However, if attestation of the given system 100 passes in block 312 (e.g., downloaded UID certificate matches system UID 193), then methodology 300 proceeds to block 316 where a certificate of ownership (or alternatively another type of certificate such as a certificate of association) is created by OS agent 107 and signed by a local certificate authority (CA) of the given system 100, which may be performed from any trusted environment, e.g., such as from a local trusted computing base (TCB) which can be any secure location on system 100, etc. This signed certificate of ownership (e.g., including information verifying successful completion of UID attestation of block 312) serves to certify ownership of the given system 100 by second enterprise owner 404, and is then sent in block 316 to backend orchestration service 151 of OEM remote server 165, where it is associated with the OEM user accounts of both the first enterprise owner 402 and the second enterprise owner 404 in backend database 156.

Then, in block 318, backend orchestration service 151 replaces or removes any existing certificate (or other type of certificate of association) for the given system 100 (e.g., certifying previous ownership of the given system 100 by first enterprise owner 402 or certifying other type of association of the given system 100 with the first enterprise owner 402) that is stored in backend data base 156 and places the received new certificate of ownership for the second enterprise owner 404 (i.e., certifying ownership of the given local system 100 by the second enterprise owner 404) into the backend database 156, where it is stored and maintained (or otherwise associated) with other OEM user account information for the second enterprise owner 404. This gives the second enterprise owner 404 immediate ownership of the given information handling system 100 in block 318 and transfers entitlements (including, for example, licenses, services, and/or licenses tied to software entitlements and provisioning) for the given system 100 from the first enterprise owner 402 to the second enterprise owner 404 (e.g., including a cryptographically established and verifiable transfer of ownership and any remaining system warranty term to the second enterprise owner 404). At this time, the data associated with the chain of ownership of the given system 100 may be stored in backend database 156, where it is available to backend orchestration service 151 and LMS 152.

In one embodiment, the UID 193 for the given local system 100 may also be tied or otherwise associated to (e.g., added to) the pre-existing information (e.g., enterprise name, enterprise billing address, enterprise physical address, etc.) already included in the pre-existing information of the OEM user account of the second enterprise owner 404 that is maintained in the system manufacturer backend database 156 on OEM remote server 165. In this way, the given local system 100 may be registered (e.g., as a warranty eligible device) to the OEM user account of the second enterprise owner 404 (e.g., for warranty and future notification purposes). In this way, a chain of title for the local information handling system is updated and maintained on backend database 156 of OEM remote server 165.

Next, in block 320, backend orchestration service 151 notifies the first enterprise 402 of the completed ownership transfer of the given information handling system 100 to the second enterprise owner 404, e.g., by sending a notification email or other communication to first IT administrative server 130 and by crediting the OEM user account of the first enterprise owner 402 with transfer of the system 100 to the second enterprise owner 404. At this time the given information handling system 100 may be unlocked and provisioned by the OEM (or OEM-authorized distributor) of the given system 100 via remote OEM server 165 or other remote OEM-operated system 166, e.g., by enrollment of the registered OEM user account of the second enterprise owner 402 with or to OS 101 of the given information handling system 100.

In one exemplary embodiment, the notification of block 320 may give the first enterprise 402 a defined designated period of time (e.g., a time limit of 30 days or other greater or lesser predefined time period) to either relinquish ownership of the given information handling system 100, or to instead contest (or dispute) the ownership transfer (e.g., by claiming that the given information handling system 100 was actually stolen from the first enterprise 402).

Assuming that the first enterprise 402 does not contest or otherwise dispute the ownership transfer of the given information handling system 100 in block 322, then the ownership transfer is successfully completed in block 324. Alternatively, the first enterprise 402 may contest or otherwise dispute the ownership transfer in block 322, e.g., by sending an email or other communication to backend orchestration service 151 or other logic executing on remote server 165. This may occur, for example, where the first enterprise 402 claims that the given information handling system 100 was actually stolen from the first enterprise 402. In such a case, it means that the second enterprise 404 has breached the terms of its OEM user account (by attempting to complete a fraudulent transfer of information handling system 100). In such a case, methodology 300 proceeds to block 326 where the OEM user account of the second enterprise 404 may be revoked by the OEM and/or other action taken by the OEM, e.g., such as further investigation of the ownership transfer situation by technical service personnel employed by the OEM.

It will understood that the particular combination of tasks or functions of the blocks of FIGS. 2-4 are exemplary only, and that other combinations of additional and/or alternative tasks or functions may be employed that are suitable for transferring information handling systems between different system owners (e.g., between different enterprises).

It will also be understood that one or more of the tasks, functions, or methodologies described herein (e.g., including those described herein for components 101, 102, 103, 107, 110, 125, 130, 134, 151, 152, 155, 156, 165, 166, 175, 180, 194, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps, tasks and/or functions of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps, tasks and/or functions of the present methodologies may be employed in one or more code segments of the computer program. For example, a code segment executed by the information handling system may include one or more steps, tasks and/or functions of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising first verifying current hardware components installed as part of a local information handling system by determining if the current hardware components are the same as original hardware components that were installed as part of the local information handling system during manufacture of the local information handling system; and then performing the following only if it is determined that the current hardware components are the same as the original hardware components:
sanitizing the local information handling system by erasing all personal identifiable information from nonvolatile memory and storage of the local information handling system;
then physically transferring the sanitized local information handling system from a first enterprise facility of a first enterprise to a second and different enterprise facility of a second enterprise;
then pushing down an original unique identifier (UID) certificate including an original UID of the local information handling system across a network to the local information handling system;
then executing a programmable integrated circuit on the local information handling system to:
retrieve a current unique identifier (UID) stored on a non-volatile memory of the local information handling system, and
then verify the current unique identifier (UID) of the local information handling system by determining if the current UID that is currently stored on the local information handling system is the same as the original UID that was pushed down across the network to the local information handling system, and that was originally assigned to the local information handling system at manufacture time of the local information handling system; and then changing an association of the local information handling system with the first enterprise to an association with the second enterprise only if it is determined that the current UID is the same as the original UID.

2. The method of claim 1, where the verifying of the current hardware components and the sanitizing of the local information handling system occur at a first physical location of the first enterprise facility: where the verifying of the current UID occurs at a second and different physical location of the second enterprise facility; and where changing the association of the local information handling system occurs on a remote information handling system that is communicatively coupled across at least one network to the local information handling system at the second physical location of the second enterprise facility.

3. The method of claim 1, further comprising not erasing all personal identifiable information from non-volatile memory and storage of the local information handling system, not physically transferring the local information handling system from the first enterprise facility of the first enterprise to the second enterprise facility of the second enterprise, and not changing the association of the local information handling system with the first enterprise to the association with the second enterprise only if it is determined that the current hardware components are not the same as the original hardware components.

4. The method of claim 1, where the physically transferring further comprises physically transferring the sanitized local information handling system directly from a first physical location of the first enterprise facility to a second and different physical location of the second enterprise facility.

5. The method of claim 1, further comprising tracking an elapsed time of a predefined fixed period of time during which the local information handling system is physically located at the first enterprise facility of the first enterprise; and initiating the method of claim 1 when it is determined that a remaining time of the predefined fixed period of time is equal to a designated minimum threshold amount of remaining time.

6. A method, comprising first verifying current hardware components installed as part of a local information handling system by determining if the current hardware components are the same as original hardware components that were installed as part of the local information handling system during manufacture of the local information handling system; and then performing the following only if it is determined that the current hardware components are the same as the original hardware components:

sanitizing the local information handling system by erasing all personal identifiable information from non-volatile memory and storage of the local information handling system;

then physically transferring the sanitized local information handling system from a first enterprise facility of a first enterprise to a second and different enterprise facility of a second enterprise;

then verifying a current unique identifier (UID) of the local information handling system by determining if the current UID that is currently stored on the local information handling system is the same as an original UID that was originally assigned to the local information handling system at manufacture time of the local information handling system; and then changing an association of the local information handling system with the first enterprise to an association with the second enterprise only if it is determined that the current UID is the same as the original UID;

where the verifying of the current hardware components and the sanitizing of the local information handling system occur at a first physical location of the first enterprise facility: where the verifying of the current UID occurs at a second and different physical location of the second enterprise facility; and where changing the association of the local information handling system occurs on a remote information handling system that is communicatively coupled across at least one network to the local information handling system at the second physical location of the second enterprise facility;

where the method further comprises creating, on the local information handling system at the second physical location of the second enterprise facility, a certificate that certifies association of the local information handling system with the second enterprise only if it is determined that the current UID is the same as the original UID;

where association information of the first enterprise and the second enterprise are both administered on a remote information handling system communicatively coupled across the at least one network to the local information handling system at the second physical location of the second enterprise facility; and where the changing the association of the local information handling system further comprises sending the created certificate from the local information handling system to the remote information handling system, and then storing the created certificate in a database that is communicatively accessible by the remote information handling system to associate the local information handling system with the second enterprise.

7. A method, comprising first verifying current hardware components installed as part of a local information handling system by determining if the current hardware components are the same as original hardware components that were installed as part of the local information handling system during manufacture of the local information handling system; and then performing the following only if it is determined that the current hardware components are the same as the original hardware components:

sanitizing the local information handling system by erasing all personal identifiable information from non-volatile memory and storage of the local information handling system;

then physically transferring the sanitized local information handling system from a first enterprise facility of a first enterprise to a second and different enterprise facility of a second enterprise;

then verifying a current unique identifier (UID) of the local information handling system by determining if the current UID that is currently stored on the local information handling system is the same as an original UID that was originally assigned to the local information handling system at manufacture time of the local information handling system; and then changing an association of the local information handling system with the first enterprise to an association with the second enterprise only if it is determined that the current UID is the same as the original UID;

where the verifying current hardware components installed as part of the local information handling system further comprises:
creating an inventory of the current hardware components that are currently installed as part of the local information handling system, and
comparing the created inventory of the current hardware components of the local information handling system to a list of the original hardware components that is previously stored on non-volatile memory (NVM) of the local information handling system to determine if the created inventory of current hardware components is the same as the list of the original hardware components.

8. A method, comprising first verifying current hardware components installed as part of a local information handling system by determining if the current hardware components are the same as original hardware components that were installed as part of the local information handling system during manufacture of the local information handling system; and then performing the following only if it is determined that the current hardware components are the same as the original hardware components:
sanitizing the local information handling system by erasing all personal identifiable information from non-volatile memory and storage of the local information handling system;
then physically transferring the sanitized local information handling system from a first enterprise facility of a first enterprise to a second and different enterprise facility of a second enterprise;
then verifying a current unique identifier (UID) of the local information handling system by determining if the current UID that is currently stored on the local information handling system is the same as an original UID that was originally assigned to the local information handling system at manufacture time of the local information handling system; and
then changing an association of the local information handling system with the first enterprise to an association with the second enterprise only if it is determined that the current UID is the same as the original UID;
where the method further comprises locking the local information handling system at the first enterprise facility of the first enterprise only if it is determined that the current hardware components are the same as the original hardware components, and prior to physically transferring the sanitized local information handling system from the first enterprise facility of the first enterprise to the second and different enterprise facility of the second and different enterprise.

9. The method of claim 8, further comprising unlocking the local information handling system at the second enterprise facility of the second enterprise only if it is determined that the current UID is the same as the original UID.

10. A method, comprising first verifying current hardware components installed as part of a local information handling system by determining if the current hardware components are the same as original hardware components that were installed as part of the local information handling system during manufacture of the local information handling system; and then performing the following only if it is determined that the current hardware components are the same as the original hardware components:
sanitizing the local information handling system by erasing all personal identifiable information from non-volatile memory and storage of the local information handling system;
then physically transferring the sanitized local information handling system from a first enterprise facility of a first enterprise to a second and different enterprise facility of a second enterprise;
then verifying a current unique identifier (UID) of the local information handling system by determining if the current UID that is currently stored on the local information handling system is the same as an original UID that was originally assigned to the local information handling system at manufacture time of the local information handling system; and
then changing an association of the local information handling system with the first enterprise to an association with the second enterprise only if it is determined that the current UID is the same as the original UID;
where association information of the first enterprise and the second enterprise comprises respective separate pre-existing accounts of the first enterprise and the second enterprise that are maintained and administered by a remote information handling system coupled across at least one network to the local information handling system at the second enterprise facility of the second and different enterprise; and where the method further comprises:
notifying the first enterprise of the completion of the changing association of the local information handling system with the first enterprise to the association with the second enterprise by sending a notification across the at least one network to an administrative server operated by the first enterprise, and
then revoking the pre-existing account of the second enterprise that is administered by the remote information handling system only if a communication that disputes the validity of the change of association of the local information handling system to the second enterprise is received from the administrative server operated by the first enterprise within a designated time limit after sending the notification across the at least one network to an administrative server operated by the first enterprise.

11. A method, comprising first verifying current hardware components installed as part of a local information handling system by determining if the current hardware components are the same as original hardware components that were installed as part of the local information handling system during manufacture of the local information handling system; and then performing the following only if it is determined that the current hardware components are the same as the original hardware components:
sanitizing the local information handling system by erasing all personal identifiable information from non-volatile memory and storage of the local information handling system;
then physically transferring the sanitized local information handling system from a first enterprise facility of a first enterprise to a second and different enterprise facility of a second enterprise;
then verifying a current unique identifier (UID) of the local information handling system by determining if the current UID that is currently stored on the local information handling system is the same as an original UID that was originally assigned to the local information handling system at manufacture time of the local information handling system; and then changing an association of the local information handling system with the first enterprise to an association with the second enterprise only if it is determined that the current UID is the same as the original UID;

where the method further comprises:

executing a unified extensible firmware interface (UEFI) basic input/output system (BIOS) firmware driver on the local information handling system to perform the determining if the current hardware components are the same as original hardware components, deploying a first software or firmware agent across at least one network to the local information handling system, and then executing the first software or firmware agent on the local information handling system to report a determination that the current hardware components are the same as the original hardware components to another information handling system across the at least one network, and then responding to the report of the determination that the current hardware components are the same as the original hardware components by deploying a second software or firmware agent to the local information handling system and executing the second software or firmware agent to perform the sanitizing of the local information handling system only upon receipt of the determination that the current hardware components are the same as the original hardware components.

12. A system, comprising a local information handling system that comprises at least one programmable integrated circuit that is programmed to first verify current hardware components installed as part of the local information handling system at a first enterprise facility of a first enterprise by determining if the current hardware components are the same as original hardware components that were installed as part of the local information handling system during manufacture of the local information handling system, and the at least one programmable integrated circuit of the local information handling system being programmed to execute to then perform the following only if it is determined that the current hardware components are the same as the original hardware components:

sanitizing the local information handling system by erasing all personal identifiable information from non-volatile memory and storage of the local information handling system prior to a physical transfer of the sanitized local information handling system from the first enterprise facility of the first enterprise to a second and different enterprise facility of a second and different enterprise;

then, after the sanitized local information handling system is physically transferred from the first enterprise facility to the second enterprise facility, the at least one programmable integrated circuit of the local information handling system being programmed to perform the following:

receive an original unique identifier (UID) certificate including an original UID of the local information handling system from across a network coupled to the local information handling system, retrieve a current unique identifier (UID) stored on a non-volatile memory of the local information handling system that is coupled to the at least one programmable integrated circuit of the local information handling system, and then verify the current unique identifier (UID) of the local information handling system by determining if the current UID that is currently stored on the local information handling system is the same as the original UID that was pushed down across the network to the local information handling system, and that was originally assigned to the local information handling system at manufacture time of the local information handling system; and then sending a notification across at least one network from the second enterprise facility to at least one remote information handling system only if it is determined by the at least one programmable integrated circuit of the local information handling system that the current UID that is currently stored on the local information handling system is the same as the original UID of the local information handling system that was pushed down across the network to the local information handling system, the notification indicating that the local information handling system is currently associated with the second enterprise.

13. The system of claim 12, where the at least one programmable integrated circuit of the local information handling system is programmed to verify the current hardware components installed as part of the local information handling system at a first physical location of the first enterprise facility of the first enterprise by:

creating an inventory of the current hardware components that are currently installed as part of the local information handling system; and comparing the created inventory of the current hardware components of the local information handling system to a list of the original hardware components that is previously stored on non-volatile memory (NVM) of the local information handling system to determine if the created inventory of current hardware components is the same as the list of the original hardware components.

14. The system of claim 12, where the at least one programmable integrated circuit of the local information handling system is programmed to not erase all personal identifiable information from the non-volatile memory and storage of the local information handling system and to not send the notification across the at least one network to the at least one remote information handling system only if it is determined that the current hardware components are not the same as the original hardware components at the first enterprise facility of the first enterprise.

15. The system of claim 12, further comprising:

the at least one remote information handling system; and at least one administrative information handling system communicatively coupled to the local information handling system and the remote information handling system by the at least one network;

where the at least one programmable integrated of the at least one remote information handling system is programmed to:

track an elapsed time of a predefined fixed period of time during which the local information handling system is physically located at the first physical location of the first enterprise facility of the first enterprise, and then send across the at least one network a notification to the at least one administrative information handling system when it is determined that a remaining time of the predefined fixed period of time is equal to a designated minimum threshold amount of remaining time; and where the at least one programmable integrated of the at least one administrative information handling system is programmed to deploy one or more software or firmware agents across the at least one network to the local information handling system in response to the notification received from the remote information handling system to initiate the verification of the current hardware components and the sanitization of the local information handling system for changing association of the local information handling system with the first enterprise owner to that association with the second enterprise owner.

16. The system of claim 12, where the at least one programmable integrated circuit of the local information handling system is programmed to:

execute a unified extensible firmware interface (UEFI) basic input/output system (BIOS) firmware driver in a BIOS environment to perform the determining if the current hardware components are the same as original hardware components;

execute a first software or firmware agent on the local information handling system to report a determination that the current hardware components are the same as the original hardware components to another information handling system across the at least one network; and execute a second software or firmware agent on the local information handling system to perform the sanitizing of the local information handling system.

17. A system, comprising a local information handling system that comprises at least one programmable integrated circuit that is programmed to first verify current hardware components installed as part of the local information handling system at a first enterprise facility of a first enterprise by determining if the current hardware components are the same as original hardware components that were installed as part of the local information handling system during manufacture of the local information handling system, and then perform the following only if it is determined that the current hardware components are the same as the original hardware components:

sanitizing the local information handling system by erasing all personal identifiable information from non-volatile memory and storage of the local information handling system prior to a physical transfer of the sanitized local information handling system from the first enterprise facility of the first enterprise to a second and different enterprise facility of a second and different enterprise;

then, after the sanitized local information handling system is physically transferred from the first enterprise facility to the second enterprise facility, verifying a current unique identifier (UID) of the local information handling system by determining if the current UID that is currently stored on the local information handling system is the same as an original UID that was originally assigned to the local information handling system at manufacture time of the local information handling system; and then sending a notification across at least one network from the second enterprise facility to at least one remote information handling system only if it is determined that the current UID is the same as the original UID of the local information handling system, the notification indicating that the local information handling system is currently associated with the second enterprise;

where the at least one programmable integrated circuit of the local information handling system is programmed to send the notification across the at least one network from the second enterprise facility to the at least one remote information handling system by creating and then sending a certificate associating the local information handling system with the second enterprise across the at least one network from the second enterprise facility to the at least one remote information handling system.

18. The system of claim 17, where the system further comprises the at least one remote information handling system coupled across the at least one network to the local information handling system, at least one programmable integrated circuit of the remote information handling system being programmed to administer association information of the first enterprise and the second the second enterprise, and at least one database communicatively coupled to the at least one remote information handling system; and where the at least one programmable integrated circuit of the remote information handling system is programmed to receive and store the created certificate in the at least one database to associate the local information handling system with the second enterprise.

19. The system of claim 18, further comprising an administrative server at the first enterprise location communicatively coupled across the at least one network to the remote information handling system; where association information of the first enterprise and the second enterprise comprises respective separate pre-existing accounts of the first enterprise and the second enterprise that are maintained and administered by the at least one remote information handling system; and where the at least one programmable integrated circuit of the remote information handling system is programmed to:

notify the first enterprise of the completion of the changing association of the local information handling system with the first enterprise to the association with the second enterprise by sending a notification across the at least one network to the administrative server; and then revoke the pre-existing account of the second enterprise that is administered by the remote information handling system only if a communication that disputes the validity of the change of the association of the local information handling system to the second enterprise is received across the at least one network from the administrative server within a designated time limit after sending the notification across the at least one network to the administrative server.

20. A system, comprising a local information handling system that comprises at least one programmable integrated circuit that is programmed to first verify current hardware components installed as part of the local information handling system at a first enterprise facility of a first enterprise by determining if the current hardware components are the same as original hardware components that were installed as part of the local information handling system during manufacture of the local information handling system, and then perform the following only if it is determined that the current hardware components are the same as the original hardware components:

sanitizing the local information handling system by erasing all personal identifiable information from non-volatile memory and storage of the local information handling system prior to a physical transfer of the sanitized local information handling system from the first enterprise facility of the first enterprise to a second and different enterprise facility of a second and different enterprise;

then, after the sanitized local information handling system is physically transferred from the first enterprise facility to the second enterprise facility, verifying a current unique identifier (UID) of the local information handling system by determining if the current UID that is currently stored on the local information handling system is the same as an original UID that was originally assigned to the local information handling system at manufacture time of the local information handling system; and then sending a notification across at least one network from the second enterprise facility to at least one remote information handling system only if it is determined that the current UID is the same as the original UID of the local information handling system, the notification indicating that the local information handling system is currently associated with the second enterprise;

where the at least one programmable integrated circuit of the local information handling system is programmed to:

lock the local information handling system at the first enterprise facility of the first enterprise only if it is determined that the current hardware components are the same as the original hardware components, and prior to physically transferring the sanitized local information handling system from the first enterprise facility of the first enterprise to the second enterprise facility of the second and different enterpriser, and then unlock the local information handling system at the second enterprise facility of the second enterprise only if it is determined that the current UID is the same as the original UID.

21. A system comprising:

a remote information handling system coupled by at least one network to a local information handling system, a first administrative information handling system of a first enterprise, and a second administrative information handling system of a second enterprise, the remote information handling system comprising at least one programmable integrated circuit programmed to administer an association information of the first enterprise and an association information of the second enterprise, the association information of the first enterprise and the second enterprise comprising respective separate pre-existing accounts of the first enterprise and the second enterprise that are maintained and administered by the at least one remote information handling system; and at least one database communicatively coupled to the remote information handling system;

where the at least one programmable integrated circuit of the remote information handling system is programmed to:

track an elapsed time of a predefined fixed period of time during which the local information handling system is physically located at a first enterprise facility of the first enterprise, then send across the at least one network a notification to the first administrative information handling system when it is determined that a remaining time of the predefined fixed period of time is equal to a designated minimum threshold amount of remaining time, then receive across the at least one network a request from the second administrative information handling system to change an association of the local information handling system with the first enterprise to an association with the second enterprise, then, in response to the received request from the second administrative information handling system, deploy across the at least one network a software or firmware agent to execute on the local information handling system, then receive across the at least one network from the software or firmware agent executing on the local information handling system a second certificate associating the local information handling system with a second enterprise from a local information handling system, then replace a first certificate associating the local information handling system with the first enterprise with the second certificate in the at least one database to associate the local information handling system with the second enterprise, then send a notification across the at least one network to the first administrative information handling system notifying the first administrative information handling system of the completion of the change of the association of the local information handling system with the first enterprise to the association with the second enterprise by sending a notification across the at least one network to the administrative server, and then revoke the second enterprise account of the second enterprise that is administered by the remote information handling system only if a communication that disputes the validity of the change of the association of the local information handling system to the second enterprise is received across the at least one network from the first administrative server within a designated time limit after sending the notification across the at least one network to the first administrative server.

* * * * *